United States Patent [19]

Onozato

[11] Patent Number: 4,757,330
[45] Date of Patent: Jul. 12, 1988

[54] PEN PRESSURE DEVICE

[75] Inventor: Takashi Onozato, Morioka, Japan

[73] Assignee: Alps Electrical Co., Ltd., Japan

[21] Appl. No.: 19,036

[22] Filed: Feb. 26, 1987

[30] Foreign Application Priority Data

Jul. 7, 1986 [JP] Japan .................... 61-157781

[51] Int. Cl.$^4$ .................... G01D 9/30; G01D 15/16
[52] U.S. Cl. .................... 346/139 R; 346/46; 346/49
[58] Field of Search .................... 346/134, 139 R, 46, 346/49, 141

[56] References Cited

U.S. PATENT DOCUMENTS 4,644,371  2/1987  Matsuura .................... 346/139 R
4,673,954  6/1987  Sakai .................... 346/139 R Primary Examiner—E. A. Goldberg
Assistant Examiner—Mark Reinhart
Attorney, Agent, or Firm—Guy W. Shoup; Leighton D. Chong

[57] ABSTRACT

In a pen pressure device including a carriage, a pen axially movably supported to the carriage in such a manner that a front end of the pen is opposed to a paper, a pen pressure spring for biasing the pen toward the paper, a return spring for biasing the pen in a direction apart from the paper; the improvement comprises a hammer mounted on the carriage and adapted to be biased by the pen pressure spring having a spring force greater than that of the return spring to thereby urge the pen, and a cam member for moving the hammer to a retracted position where the pen is not urged by the hammer.

6 Claims, 2 Drawing Sheets

PEN PRESSURE DEVICE

BACKGROUND OF THE INVENTION

The present invention relates to a pen pressure device for bringing a pen into contact with or separation from a paper in an X-Y plotter and the like.

In the X-Y plotter, the pen is arranged such that a front end thereof is opposed to the paper, and is moved in two directions of an X-axis and a Y-axis which are perpendicular to each other. Alternatively, the pen is moved in either direction of the X-axis or the Y-axis, and the paper is moved in the other direction. Then, the pen is brought into contact with or separation from the paper by the pen pressure device, thereby printing a graphic or the like on the paper moving in the two directions relative to the pen.

Conventionally, the above-mentioned X-Y plotter has employed a pen pressure device 1 as shown in FIGS. 4 and 5.

Referring to FIGS. 4 and 5, a carriage 4 of the X-Y plotter is movable in a direction parallel to a paper plane of a paper 3 along a pair of guide rods 2. The carriage 4 is provided at its upper surface with a mount portion 6 on which a pen 5 is axially movably mounted in a manner that a front end of the pen 5 is opposed to the paper 3. The pen 5 is formed at its front side with a small-diameter portion 8 through a frusto-conical tapered portion 7. The small-diameter portion 8 is inserted through a guide hole 9 formed through the carriage 4, and is adapted to contact under pressure with the paper 3.

A coiled pen pressure spring 10 is mounted at a rear end of the mount portion 6 of the carriage 6 in such a manner as to contact under pressure with a rear end of the pen 5. The pen pressure spring 10 acts to bias the pen 5 toward the paper 3 under a predetermined pressure suitable for writing on the paper 3. A lever 11 is rockably supported at its lower end by a pin 12 to the carriage 4. The lever 11 is formed at its upper end portion with a circular hole 13 with which the small-diameter portion 7 of the pen 5 is engaged. A coiled return spring 14 is located around the small-diameter portion 8 of the pen 5 to bias the circular hole 13 clockwise as viewed in FIG. 4 and urge the pen 5 away from the paper 3. A spring force of the return spring 14 is set stronger than that of the pen pressure spring 10. Accordingly, when both the spring forces of the springs 10 and 14 are applied to the pen 5 at the same time in counter directions, the pen 5 is separated from the paper 3 as shown in FIG. 4, which is called a pen-up condition.

In the carriage 4 is accommodated a solenoid 15 having a plunger 16 for biasing the lever 11 counterclockwise against the spring force of the return spring 14. When the solenoid 15 is excited, the plunger 16 urges the lever 11 to rotate the same counterclockwise from the position shown in FIG. 4, thus eliminating the influence of the spring force of the return spring 14 to the pen 5 through the lever 11. Accordingly, the pen 5 is brought into pressure contact with the paper 3 by the operation of the pen pressure spring 10 as shown in FIG. 5, which is called a pen-down condition.

With this arrangement, the pen 5 is moved to select the pen-up condition of FIG. 4 or the pen-down condition of FIG. 5 while the carriage 4 is moved, and the solenoid 15 is excited or deexcited according to information of drawing, thus forming a desired drawing on the paper 3.

However, in the conventional pen pressure device as mentioned above, the spring force of the return spring 14 must be set much greater than that of the pen pressure spring 10, so as to stably retain the pen 5 under the pen-up condition shown in FIG. 4. In selecting the pen-down condition, a large output of the solenoid 15 urging the lever 11 is necessary for eliminating the influence of the spring force of the return spring 14. As a result, the solenoid 15 must be made large-scale to cause an increase in costs, power consumption of the solenoid 15 and a running cost. Further, a high noise is generated upon rotation of the lever 11.

In the case that the pen-down condition shown in FIG. 5 is maintained for a relatively long time, such as a case of drawing a line on the paper 3 by the pen, the solenoid 15 must continue to be supplied with current or it must be of a self-holding type. When the self-holding type solenoid 15 is used, it is required to usually provide a spring as an operational load of the solenoid 15, and therefore, a further greater output of the solenoid 15 is necessary. Furthermore, when the current is continuously supplied to the solenoid 15 during the pen-down condition, a power consumption is more increased.

SUMMARY OF THE INVENTION

It is an object of the present invention to provide a pen pressure device which may suppress a noise during operation.

It is another object of the present invention to provide a pen pressure device which may reduce a running cost such as a power consumption.

It is a further object of the present invention to provide a pen pressure device which may be manufactured with a reduced cost in a simple structure.

According to the present invention, there is provided in a pen pressure device including a carriage, a pen axially movably supported to the carriage in such a manner that a front end of the pen is opposed to a paper, a pen pressure spring for biasing the pen toward the paper, a return spring for biasing the pen in a direction apart from the paper; the improvement comprising a hammer mounted on the carriage and adapted to be biased by the pen pressure spring having a spring force greater than that of the return spring to thereby urge the pen, and a cam member for moving the hammer to a retracted position where the pen is not urged by the hammer.

Other objects and features of the invention will be more fully understood from the following detailed description and appended claims when taken with the accompanying drawings.

DETAILED DESCRIPTION OF THE PREFERRED EMBODIMENT

Figure 1:
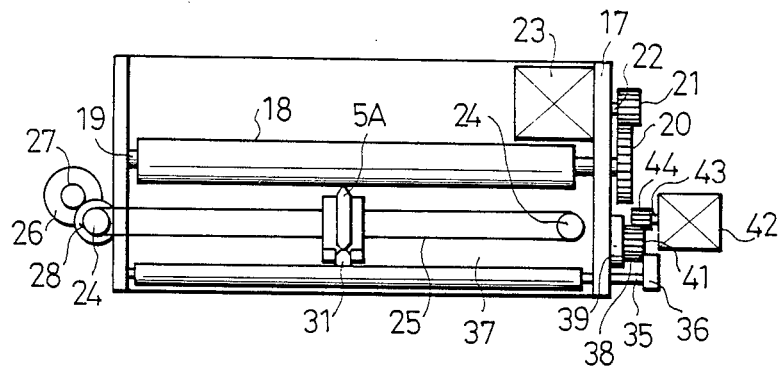
FIG. 1 is a plan view of an X-Y plotter employing the pen pressure device of the present invention.

There will be now described a preferred embodiment of the present invention with reference to the drawings, in which the same parts as in the afore-mentioned prior art are designated by the same reference numerals.

Referring to FIG. 1 which schematically shows an X-Y plotter employing a pen pressure device 1A of the present invention, a rotary shaft 19 of a platen 18 is rotatably supported to a frame 17, and a gear wheel 20 is engaged with the rotary shaft 19 at one end thereof. The gear wheel 20 is meshed with a pinion 23 engaged with an output shaft 22 of a motor 21 mounted on the frame 17. Accordingly, the platen 18 is rotated with a reduced speed by driving the motor 21 to feed a paper 3 wound around the platen. There is provided on the front side of the platen 18 a carriage 4A connected with a wire 25 wound around a pair of pulleys 24 and movable in parallel to an axial direction of the platen 18. The wire 25 is designed to be moved by driving one pulley 24 connected through gears 27 and 28 to a motor 26.

Figure 2:
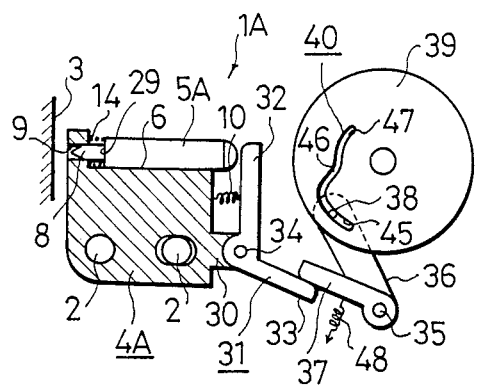
FIG. 2 and 3 are sectional side views of the pen pressure device shown in FIG. 1 under the pen-up condition and the pen-down condition, respectively.
Figure 3:
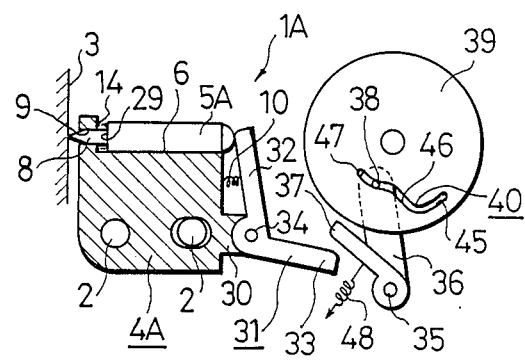
Figure 4:
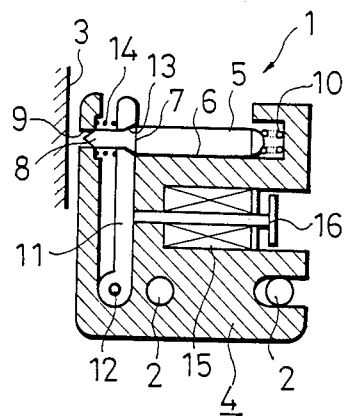
FIGS. 4 and 5 are sectional side views of the pen pressure device in the prior art under the pen-up condition and the pen-down condition, respectively.
Figure 5:
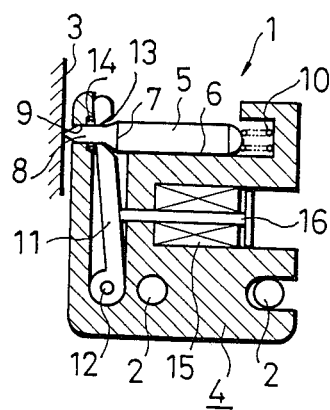

Referring to FIGS. 2 and 3, the carriage 4A is formed at its upper portion with a pen mount portion 6. A pen 5A is axially movably mounted on the mount portion 6. The pen 5A is formed at its front end portion with a small-diameter portion 8 through a shoulder 29. A return spring 14 is interposed between the carriage 4A and the shoulder 29 of the pen 5A so as to bias the pen 5A in a direction away from the paper 3. A bracket 30 is projected from a lower portion of the carriage 4A on the rear end side of the pen 5A. A bell crank-like lever 31 is rockably supported by a pin 34 to the bracket 30. The lever 31 has a first arm 32 adapted to abut at its upper end against the rear end of the pen 5A. There is interposed between the first arm 32 of the lever 31 and the carriage 4A a pen pressure spring 10 for biasing the lever 31 counterclockwise as viewed in FIGS. 2 and 3. A spring force of the pen pressure spring 10 is set stronger than that of the return spring 14, and a difference between the spring forces of the springs 10 and 14 permits the pen 5A to be pressed on the paper 3 under a predetermined pressure for writing.

A rotary shaft 35 is supported to the frame 17 in such a manner as to be arranged adjacent to a moving range of the carriage 4A. A second lever 37 is mounted on the rotary shaft 35, and is adapted to rotate synchronously therewith and engage with a second arm 33 of the lever 31 extending in a substantially horizontal direction. As shown in FIG. 1, the second lever 37 is of a plate-like shape extending almost over the moving range of the carriage 4A. A first lever 36 is mounted at one end portion of the rotary shaft 35 outside the frame 17 in such a manner as to be rotated synchronously with the rotary shaft 35. A pin-like cam follower 38 is embedded at an end portion of the first lever 36. A disc-like grooved cam 39 as an example of a cam member is rotatably supported on the outside of the frame 17, and is formed with a cam groove 40, which will be hereinafter described, engaged with the cam follower 38. A gear 41 is mounted on the grooved cam 39, and is meshed with a gear 44 mounted on an output shaft 43 of a motor 42. Accordingly, the grooved cam 39 is rotated by driving the motor 42.

As shown in FIGS. 2 and 3, the cam groove 40 of the groove cam 39 consists of a first annular groove 45 having a large diameter, a second annular groove 47 having a small diameter, and a communication groove 46 connecting one end of the first annular groove 45 with one end of the second annular groove 47 so that the cam follower 38 may smoothly move in the first annular groove 45 and the second annular groove 47. When the cam follower 38 of the first lever 36 is positioned in the first annular groove 45 of the cam groove 40 as shown in FIG. 2 by the rotation of the grooved cam 39, the second lever 37 engages with the second arm 33 of the lever 31 to constrain the lever 31 in a retracted position where it is separated from the pen 5A against the pen pressure spring 10. On the other hand, when the cam follower 38 of the first lever 36 is positioned in the second annular groove 47 of the cam groove 40 as shown in FIG. 3, the second arm 33 of the lever 31 is disengaged from the second lever 37, and the first arm 32 of the lever 31 urges the pen 5A against the paper 3 by the operation of the pen pressure spring 10. A tension spring 48 is connected at its one end to the second lever 37 so as to bias the same in a direction where the second lever 37 is brought into engagement with the second arm 33 of the lever 31, while being connected at the other end to a fixed member not shown. The spring 48 acts to reduce a spring force of the pen pressure spring 10 upon shifting from the pen-down condition of FIG. 3 to the pen-up condition of FIG. 2. If a spring force of the spring 48 is too strong, an increased load is applied to the pen in the pendown operation. Therefore, the spring force of the spring 48 is set to preferably about half the spring force of the pen pressure spring 10.

The operation of the above preferred embodiment will be described below.

In the pen-up condition shown in FIG. 2, the cam follower 38 of the first lever 36 is positioned in the first annular groove 45 of the grooved cam 39, and the second lever 37 is engaged with the second arm 33 of the lever 31 at the rotational position of the first lever 36 to thereby constrain the lever 31 in the retracted position where the first arm 32 of the lever 31 is separated from the rear end of the pen 5A against the pen pressure spring 10. Then, the pen 5A is retained at a position separated from the paper 3 by the operation of the return spring 14 biasing the pen 5A in a direction apart from the paper 3. Under the condition, the cam follower 38 is stopped at a substantially circumferentially central position of the first annular groove 45. Therefore, the pen-up condition of FIG. 2 may be stably maintained without any specific stopper means.

In shifting the pen-up condition of FIG. 2 to the pen-down condition of FIG. 3, the grooved cam 39 under the condition of FIG. 2 is rotated counterclockwise at about 70 degrees by the operations of the motor 42 to move the cam follower 38 of the first lever 36 to the second annular groove 47 of the grooved cam 39. Then, the first lever 36 is rotated clockwise together with the second lever 37 to disengage the second lever 37 from the lever 31. As a result, the lever 31 is rendered free, and it urges the pen 5A owing to the spring force of the pen pressure spring 10 to bring the pen 5A into pressure contact with the paper 3 against the return spring 14. Thus, the pen-down condition of the pen 5A is provided. Under the condition, the cam follower 38 is stopped at a substantially circumferentially central position of the second annular groove 47. Therefore, the pen-down condition of FIG. 3 may be stably maintained without any specific stopper means.

According to the afore-mentioned preferred embodiment, retention of the pen-up condition of the pen 5A is effected only by the spring force of the return spring 14 rather than the pressure differential between the pen pressure spring 10 and the return spring 14. Accordingly, a small spring force of the return spring 14 is merely required, and thereby it is not necessary to make so large the spring force of the pen pressure spring 10 for contacting the pen 5A with the paper 3 against the return spring 14. Furthermore, the spring force of the pen pressure spring 10 may be reduced by the spring 48. Accordingly, the motor 42 to be used for rotating the lever 31 against the pen pressure spring 10 does not require so large driving force. Since the retention of the pen-up condition is effected without an electric power, a power consumption may be reduced. Moreover, there is not generated an impact noise upon collision of the plunger against the side surface of the solenoid, and as a spring with a large spring force is not used, a noise may be reduced. Additionally, as the construction is relatively simple, a manufacturing cost may be reduced.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a pen pressure device including a carriage, a pen supported on the carriage and axially movable between a first position, wherein a front end of the pen is brought into contact with a paper for printing thereon, and a second position, wherein the front end is retracted away from contact with the paper, the improvement comprising:
a hammer pivotably mounted on the carriage having one end movable between a first state, wherein said one end is in pressing contact against a rear end of the pen to press the front end thereof into contact with the paper, and a second state wherein said one end of said hammer is retracted away from pressing contact against the rear end of the pen;
a lever movable into abutment with another end of said hammer for moving said one end of said hammer to the retracted second state and movable away from abutment with said other end of said hammer for releasing said one end of said hammer from the retracted second state;
a cam member for selectively moving said lever as described above;
a return spring mounted between the pen and the carriage for biasing the pen toward its retracted, second position; and
a pen pressure spring mounted between said one end of said hammer and the carriage for biasing said one end of said hammer toward its pressing, first state, said pen pressure spring having a predetermined spring force which is greater than a predetermined spring force of said return spring,
whereby, when said lever is moved into abutment with said other end of said hammer, said lever overcomes a difference between the spring forces of said pen pressure spring and said return spring and moves said one end of said hammer to the second retracted state, and when said lever is moved away from abutment with said other end of said hammer, the greater spring force of said pen pressure spring over said return spring moves said one end of said hammer to the pressing first state against the rear end of the pen and the front end of the pen is brought into contact with the paper with a predetermined constant force corresponding to a difference between the spring forces of said pen pressure spring and said return spring.

2. The pen pressure device as defined in claim 1, wherein said hammer is rotatably supported to said carriage, and said cam member comprises a grooved cam adapted to be rotated by a motor, said pen pressure device further comprising a first lever provided with a cam follower engaged with a cam groove of said grooved cam and adapted to be rotated by rotation of said grooved cam, and a second lever adapted to be rotated by rotation of said first lever, said second lever being designed to take a retracted position of said hammer where said second lever is engaged with said hammer and a released position of said hammer where said second lever is disengaged from said hammer.

3. The pen pressure device as defined in claim 2, wherein said cam groove consists of a first annular groove having a large diamter, a second annular groove having a small diameter and a communication groove connecting said first annular groove with said second annular groove.

4. The pen pressure device as defined in claim 3, wherein said retracted position of said hammer is locked when said cam follower is located at a circumferentially central position of said first annular groove, while said released position of said hammer is locked when said cam follower is located at a circumferentially central position of said second annular groove.

5. The pen pressure device as defined in claim 2, further comprising a tension spring connected to said second lever for biasing said second lever in a direction engaging said second lever with said hammer.

6. The pen pressure device as defined in claim 5, wherein said tension spring has a spring force about half that of said pen pressure spring.

* * * * *